United States Patent
Nishimura et al.

(10) Patent No.: US 11,476,701 B2
(45) Date of Patent: Oct. 18, 2022

(54) UNINTERRUPTABLE POWER SUPPLY DEVICE

(71) Applicant: NISSIN ELECTRIC CO., LTD., Kyoto (JP)

(72) Inventors: Shoji Nishimura, Kyoto (JP); Yoshinori Kawasaki, Kyoto (JP); Satoshi Uda, Kyoto (JP)

(73) Assignee: NISSIN ELECTRIC CO., LTD., Kyoto (JP)

( * ) Notice: Subject to any disclaimer, the term of this patent is extended or adjusted under 35 U.S.C. 154(b) by 0 days.

(21) Appl. No.: 17/053,790

(22) PCT Filed: May 13, 2019

(86) PCT No.: PCT/JP2019/018913
§ 371 (c)(1),
(2) Date: Nov. 8, 2020

(87) PCT Pub. No.: WO2019/221053
PCT Pub. Date: Nov. 21, 2019

(65) Prior Publication Data
US 2021/0265857 A1    Aug. 26, 2021

(30) Foreign Application Priority Data
May 15, 2018   (JP) .............................. JP2018-094073

(51) Int. Cl.
*H02J 9/06*   (2006.01)
*H02J 3/01*   (2006.01)
(Continued)

(52) U.S. Cl.
CPC ................ *H02J 9/062* (2013.01); *H02J 9/06* (2013.01); *H02J 3/00125* (2020.01); *H02J 3/01* (2013.01); *H02J 3/24* (2013.01); *H02J 3/32* (2013.01)

(58) Field of Classification Search
CPC ...................................... H02J 9/06; H02J 3/01
(Continued)

(56) References Cited

U.S. PATENT DOCUMENTS 6,304,006 B1 *  10/2001  Jungreis ................. H02J 9/062
                                                                307/64
7,262,520 B2 *   8/2007  Nguyen .................... H02J 3/38
                                                                307/86
(Continued)

FOREIGN PATENT DOCUMENTS

JP     H11252826       9/1999
JP     2000278882      10/2000
(Continued)

OTHER PUBLICATIONS

"International Search Report (Form PCT/ISA/210) of PCT/JP2019/018913," dated Jul. 9, 2019, with English translation thereof, pp. 1-3.
(Continued)

*Primary Examiner* — Michael R. Fin
(74) *Attorney, Agent, or Firm* — JCIPRNET (57) ABSTRACT

Provided is an uninterruptable power supply device. An uninterruptable power supply device 100, which is provided between a commercial power system 10 and an essential load 30 and which provides AC power to the essential load 30, wherein the uninterruptable power supply device 100 is provided with: a power supply unit 2, which has a power converter 22 and a storage battery 21 and which is connected to a power line L1; an open switch 3 for opening the power supply line L1; a system abnormality detection unit 5 for detecting a system abnormality, which is at least one of voltage rise, phase fluctuation, voltage imbalance, harmonic abnormality, and flicker, in addition to at least one of frequency fluctuation and voltage drop including instantaneous voltage drop; and a control unit 6 which, opens the (Continued)

open switch 3 and supplies AC power to the essential load 30.

6 Claims, 8 Drawing Sheets

(51) Int. Cl.
 *H02J 3/00* (2006.01)
 *H02J 3/24* (2006.01)
 *H02J 3/32* (2006.01)

(58) Field of Classification Search
 USPC .................................................. 307/64, 65
 See application file for complete search history.

(56) References Cited

U.S. PATENT DOCUMENTS

| | | | |
|---|---|---|---|
| 2004/0084965 A1 | 5/2004 | Welches et al. | |
| 2005/0012395 A1* | 1/2005 | Eckroad | H02J 3/1807 307/44 |
| 2005/0105229 A1* | 5/2005 | Deng | H02J 9/062 361/90 |
| 2006/0125448 A1* | 6/2006 | Okui | H02J 9/062 320/138 |
| 2011/0170219 A1 | 7/2011 | Yamane et al. | |
| 2013/0241291 A1* | 9/2013 | Wang | H02J 9/06 307/66 |
| 2020/0059111 A1* | 2/2020 | Guo | H02J 7/04 |

FOREIGN PATENT DOCUMENTS

| | | |
|---|---|---|
| JP | 2005229662 | 8/2005 |
| JP | 2009177961 | 8/2009 |
| WO | 2005041384 | 5/2005 |
| WO | 2019198585 | 10/2019 |

OTHER PUBLICATIONS

"Office Action of Australian Counterpart Application", dated Jul. 28, 2021, p. 1-p. 7.

S.A.O. Da Silva et al., "A three-phase line-interactive UPS system implementation with series-parallel active power-line conditioning capabilities," Conference Record of the 2001 IEEE Thirty-Sixth IAS Annual Meeting, Sep. 2001, pp. 2389-2396.

M. Oueidat et al., "Multiple feedback loop control strategy for UPS system having active filter ability," Proceedings of Intelec'96—International Telecommunications Energy Conference, Oct. 1996, pp. 450-453.

"Search Report of Europe Counterpart Application", dated Dec. 21, 2021, p. 1-p. 9.

"Office Action of India Counterpart Application" dated Dec. 8, 2021, p. 1-p. 6.

* cited by examiner

FIG. 1

| No. | Condition for system abnormality tolerance of essential load and power supply unit | Opening or closing of switch | Operation of power supply unit |
|---|---|---|---|
| (1) | System abnormality < tolerance against system abnormality | Closed | Track system abnormality and continue running as it is. |
| (2) | Tolerance against system abnormality < system abnormality | Opened | Running continues within range of limit tolerance of which system abnormality tolerance is less between essential load and power supply unit (autonomous running) |

| No. | Condition for system abnormality tolerance of essential load and power supply unit | Opening or closing of switch | Operation of power supply unit |
|---|---|---|---|
| (1) | System abnormality < threshold | Closed | Track system abnormality and continue running as it is. |
| (2) | Threshold < system abnormality | Closed | Compensation operation for system abnormality (operation of reducing change in abnormal element) |
| (3) | Tolerance against system abnormality < system abnormality | Opened | Running continues within range of limit tolerance of which system abnormality tolerance is less between essential load and power supply unit (autonomous running) |

UNINTERRUPTABLE POWER SUPPLY DEVICE

CROSS-REFERENCE TO RELATED APPLICATION

This application is a 371 application of the International PCT application serial no. PCT/JP2019/018913, filed on May 13, 2019, which claims the priority benefit of Japan Patent Application No. 2018-094073, filed on May 15, 2018. The entirety of each of the above-mentioned patent applications is hereby incorporated by reference herein and made a part of this specification.

TECHNICAL FIELD

The present invention relates to a continuous commercial power supply type uninterruptable power supply device.

BACKGROUND ART

A continuous commercial power supply type uninterruptable power supply device compensates for instantaneous voltage drop or frequency fluctuation of a system voltage of a commercial power system and is configured, for example, as disclosed in Patent Literature 1 (Japanese Patent Laid-Open No. 2005-229662), such that a power supply unit including a storage battery and a parallel inverter is connected to a load in parallel and switches are provided in the power supply unit and the load. When a system voltage of the commercial power system deviates from a predetermined allowed voltage range, the switch is opened and power is supplied from the storage battery to the load.

However, the continuous commercial power supply type uninterruptable power supply device of the related art performs only a compensation operation for instantaneous voltage drop and frequency fluctuation for a load, and may not perform a compensation operation for other system abnormalities. A system abnormality is taken into consideration only for a load and is not taken into consideration for a storage battery.

Accordingly, the present invention has been devised to solve the foregoing problems and an objective of the present invention is to provide an uninterruptable power supply device capable of responding to various system abnormalities in addition to frequency fluctuation and voltage drop including instantaneous voltage drop.

That is, according to an aspect of the present invention, an uninterruptable power supply device is an uninterruptable power supply device that is provided between a commercial power system and an essential load and provides alternating-current power to the essential load. The uninterruptable power supply device includes: a power supply unit including a power converter and a storage battery connected to a power line for supplying power from the commercial power system to the essential load; an open switch provided on the power line to a commercial power system side of the power supply unit and configured to open or close the power line; a system abnormality detection unit configured to detect a system abnormality which is at least one of voltage rise, phase fluctuation, voltage imbalance, a harmonic abnormality, and a flicker in addition to at least one of frequency fluctuation and voltage drop including instantaneous voltage drop occurring on the commercial power system side of the open switch; and a control unit configured to open the open switch when the detected system abnormality is equal to or greater than tolerance of the essential load or the power supply unit against the system abnormality, and provide alternating-current power from the power supply unit to the essential load.

In the uninterruptable power supply device, the system abnormality detection unit detects a system abnormality which is at least one of voltage rise, phase fluctuation, voltage imbalance, a harmonic abnormality, and a flicker in addition to at least one of frequency fluctuation and voltage drop including instantaneous voltage drop. Thus, when the detected system abnormality is equal to or greater than tolerance of the essential load or the power supply unit against the system abnormality, the open switch is opened. Therefore, it is possible to respond to various system abnormalities in addition to frequency fluctuation and voltage drop including instantaneous voltage drop. Since the open switch is opened using not only the tolerance of the essential load against the system abnormality but also tolerance of the power supply unit against the system abnormality as parameters, it is possible to respond to a system abnormality taken into consideration for not only the essential load but also the power supply unit.

Here, the phase fluctuation, the voltage imbalance, the harmonic abnormality, or the flicker considered as a system abnormality element can be read from interconnection regulations. Further, a three-phase system voltage is expressed as in Math. 1 by an α component (which is a real-number component) and a β component (which is an imaginary component) in a complex number subjected to a three phase-two phase conversion (α-β-0 conversion).

$$v = V_1 \cdot e^{j(2\pi f \cdot t + \theta)} + \Sigma_{n \neq 1} v_n \qquad \text{[Math. 1]}$$

Here, each element is as follows:
v: a system voltage;
$V_1$: a system voltage amplitude;
f: a system voltage frequency;
θ: or a system voltage phase: a phase fluctuation of phase jump is a change in this element;
$\Sigma_{n \neq 1} v_n$: a component other than a positive phase of a fundamental wave; there are a negative phase component of n=−1 and a harmonic component of |n|≠1; and
a flicker is a low-periodic fluctuation of a few to tens of Hz of V1.

As a result obtained by adding system abnormality elements according to this consideration, as in a continuous inverter power supply type uninterruptable power supply device which is more expensive, the continuous commercial power supply type uninterruptable power supply device can respond to system abnormality elements such as voltage rise, phase fluctuation, voltage imbalance, a harmonic abnormality, and flicker in addition to frequency fluctuation and voltage drop including instantaneous voltage drop. For example, as disclosed in <Simulation of first embodiment> to be described below, it is possible to prevent an abnormality of an uninterruptable power supply device beforehand (in this simulation, deviation due to an overcurrent abnormality of an essential load with an interconnection inverter).

According to an aspect of a specific example, the power supply unit preferably performs autonomous running within a tolerance limit in which the tolerance of the essential load or the power supply unit against the system abnormality is smaller in a state in which the open switch is an opened state.

To reduce frequency of transition to autonomous driving in which running cost is high, the control unit preferably causes the power supply unit to perform a compensation operation for the system abnormality when the system abnormality detected by the system abnormality detection unit is equal to or greater than a predetermined threshold in which the degree of abnormality is less than the tolerance of the essential load or the power supply unit against the system abnormality.

To respond to an increase in an autonomous running time, a generator connected to the power line apart from the power supply unit is preferably included.

According to the present invention configured in this way, it is possible to provide an uninterruptable power supply device capable of responding to various system abnormalities in addition to frequency fluctuation and voltage drop including instantaneous voltage drop.

DESCRIPTION OF EMBODIMENTS

First Embodiment

Hereinafter, a first embodiment of an uninterruptable power supply device according to the present invention will be described with reference to the drawings.

Figure 1:
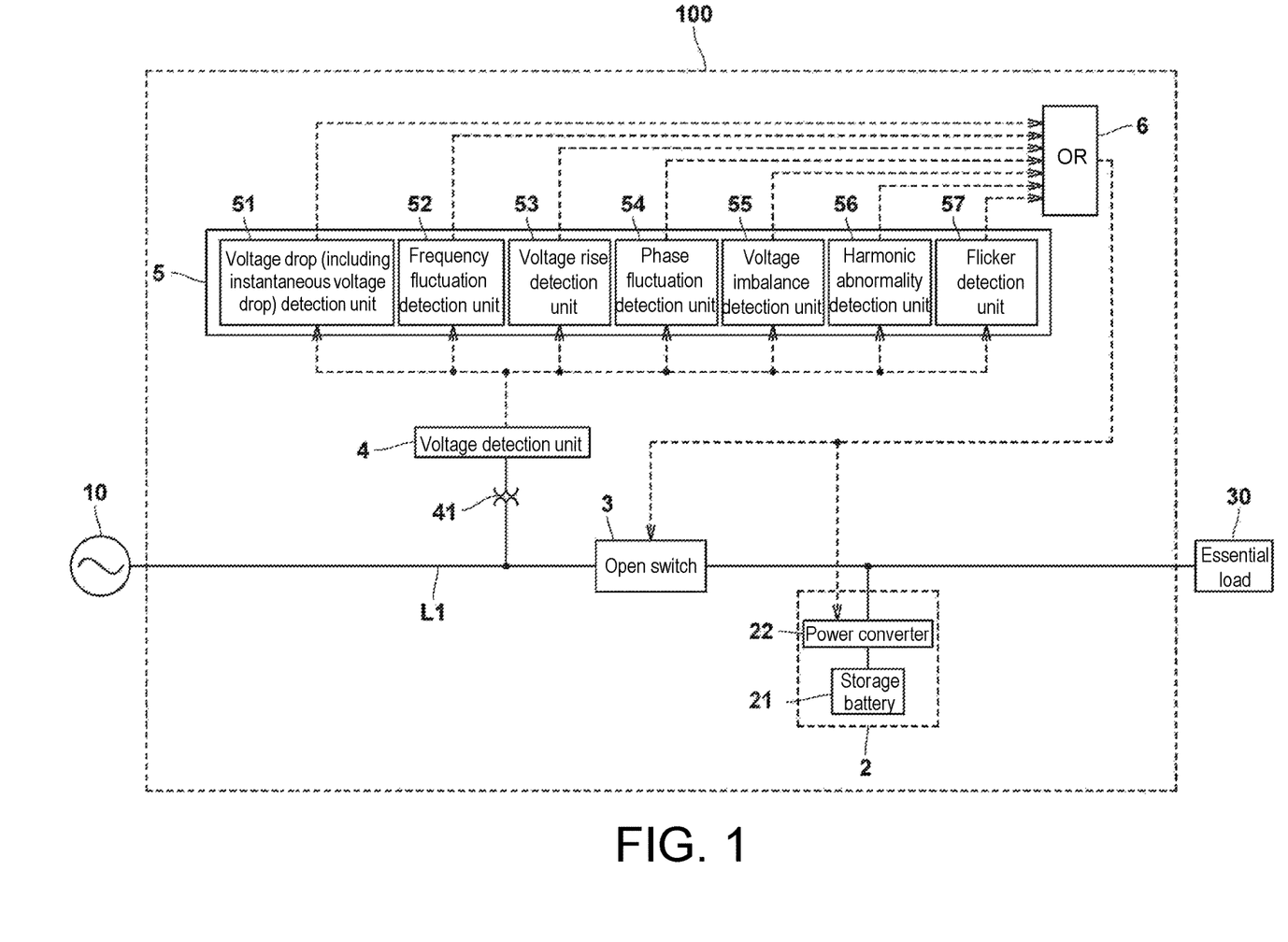
FIG. 1 is a schematic diagram illustrating a configuration of an uninterruptable power supply device according to a first embodiment.

As illustrated in FIG. 1, an uninterruptable power supply device 100 according to the first embodiment is a continuous commercial power supply type uninterruptable power supply device that is provided between a commercial power system 10 and an essential load 30 and provides power to the essential load 30 when an abnormality occurs in the commercial power system 10.

Here, the commercial power system 10 is s power supply network of a power company (electric utility) and has a power station, a transmission system, and a distribution system. An essential load 30 is a load to which power has to be stably supplied even at the time of system abnormality such as power failure or instantaneous voltage drop and although only essential load is illustrated in FIG. 1, the number of essential loads may be plural.

Specifically, the uninterruptable power supply device 100 includes a power supply unit 2, an open switch 3 connecting the commercial power system 10 to the power supply unit 2 and the essential load 30, a system-side voltage detection unit 4 that detects a voltage on the commercial power system 10 side of the open switch 3, a system abnormality detection unit 5 that detects a system abnormality from a voltage detected by the system-side voltage detection unit 4, and a control unit 6 that opens the open switch 3 in accordance with a detection signal of the system abnormality detection unit 5.

The power supply unit 2 is connected to a power line L1 for supplying power from the commercial power system 10 to the essential load 30. The power supply unit 2 is interconnected to the commercial power system 10 and includes a power storage device (a storage device) 21 such as a secondary cell (a storage cell) and a power converter (a power conditioner) 22.

The open switch 3 is provided on the commercial power system 10 side of a connection point of the power supply unit 2 on the power line L1 and opens or closes the power line L1. For example, an uninterruptable switch capable of performing high-speed switching, such as a semiconductor switch or a hybrid switch in which a semiconductor switch and a mechanical switch are combined, can be used. For example, when a semiconductor switch is used, a switching time can be set to be equal to or less than 2 milliseconds. Thus, cutoff can be realized irrespective of a zero point. When a hybrid switch is used, a switching time can be set to be equal to or less than 2 milliseconds. Thus, not only cutoff can be realized irrespective of a zero point, but a conduction loss of zero can be achieved. The open switch 3 is controlled by the control unit 6 such that the open switch 3 is opened or closed.

The system-side voltage detection unit 4 detects a voltage on the commercial power system 10 side of the open switch 3 on the power line L1 via a potential transformer 41. Specifically, the system-side voltage detection unit 4 is connected closer to the commercial power system 10 side than the open switch 3 via the potential transformer 41.

The system abnormality detection unit 5 detects each system abnormality on the commercial power system 10 side of the open switch 3 from a detected voltage detected by the system-side voltage detection unit 4. The system abnormality in the embodiment is voltage drop including instantaneous voltage drop, voltage rise, frequency fluctuation, phase fluctuation, voltage imbalance, a harmonic abnormality, or flicker.

Therefore, the system abnormality detection unit 5 includes a voltage drop detection unit 51 that detects voltage drop including instantaneous voltage drop, a frequency fluctuation detection unit 52 that detects frequency fluctuation, a voltage rise detection unit 53 that detects voltage rise, a phase fluctuation detection unit 54 that detects phase fluctuation, a voltage imbalance detection unit 55 that detects voltage imbalance, a harmonic abnormality detection unit 56 that detects a harmonic abnormality, and a flicker detection unit 57 that detects flicker.

The voltage drop detection unit 51 detects voltage drop by comparing the voltage detected by the system-side voltage detection unit 4 with a predetermined set value. Here, the set value for detecting voltage drop is a voltage value for detecting an instantaneous voltage drop and is, for example, a remaining voltage of 20%.

The frequency fluctuation detection unit 52 detects frequency fluctuation (frequency rise (OF) or frequency drop (UF)) from the voltage detected by the system-side voltage detection unit 4. The frequency fluctuation is, for example, stepwise rise or ramped rise or drop.

The voltage rise detection unit 53 detects voltage rise by comparing the voltage detected by the system-side voltage detection unit 4 with a predetermined set value. Here, the set value for detecting voltage rise is, for example, a voltage of 107% of the system voltage.

The phase fluctuation detection unit 54 detects phase fluctuation such as phase jump of, for example, 10° from the phase of the voltage detected by the system-side voltage detection unit 4.

The voltage imbalance detection unit 55 detects that the magnitude of an amplitude or a phase difference of 120° among three phases from the voltage detected by the system-side voltage detection unit 4 becomes a different state.

The harmonic abnormality detection unit 56 detects a harmonic voltage from the voltage detected by the system-side voltage detection unit 4. The flicker detection unit 57 detects voltage fluctuation (flicker) from the voltage detected by the system-side voltage detection unit 4.

The control unit 6 outputs a control signal to the open switch 3 and opens the open switch 3 based on each of the detected signals detected by the system abnormality detection unit 5. The control unit 6 according to the embodiment opens the open switch 3 when the detected signal from each of the detection units 51 to 57 is received and any one detected signal satisfies a predetermined condition (OR condition).

Specifically, the control unit 6 opens the open switch 3 when at least one of the system abnormalities detected by the detection units 51 to 57 is equal to or greater than tolerance of the essential load 30 or the power supply unit 2 against each system abnormality.

An operation of the power supply unit 2 along with specific opening and closing control on the open switch 3 by the control unit 6 will be described with reference to FIG. 2.

At a normal time, the uninterruptable power supply device 100 closes the open switch 3, and the power supply unit 2 and the essential load 30 are in a state in which the power supply unit 2 and the essential load 30 are connected to the commercial power system 10 via the open switch 3.

Figure 2:
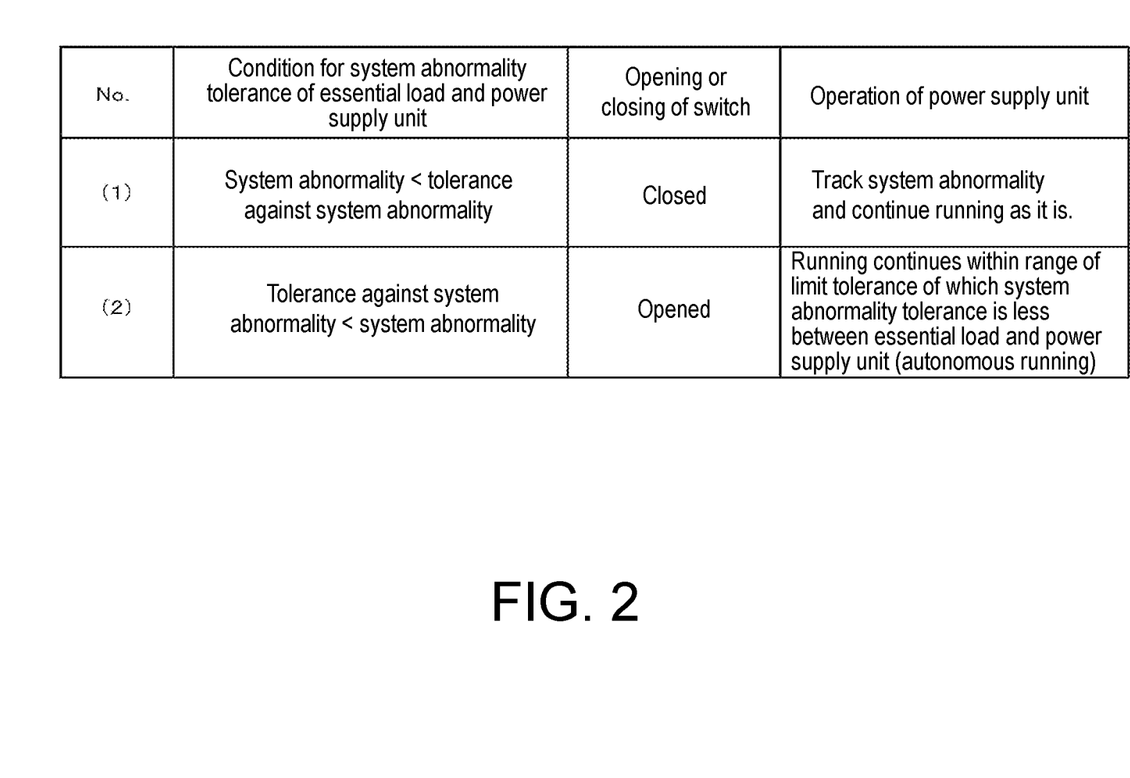
FIG. 2 is a table illustrating a list of operation states in system abnormalities according to the first embodiment.

(1) When each of the detected system abnormalities is less than a system abnormality tolerance which is less between system abnormality tolerances of the power supply unit 2 and the essential load 30 (FIG. 2 (1)), the control unit 6 holds a state in which the open switch 3 remains closed. At this time, the power supply unit 2 tracks the system abnormality of the commercial power system 10 and continues running.

(2) When the detected system abnormality is equal to or greater than system abnormality tolerance less between the system abnormality tolerances of the power supply unit 2 and the essential load 30 (FIG. 2 (2)), the control unit 6 opens the open switch 3. In this state, the power supply unit 2 continues running within a range of a tolerance limit of which the system abnormality tolerance is less between the essential load 30 and the power supply unit 2 (autonomous running of the power supply unit 2).

The detection units 51 to 57 detect each system abnormality of the commercial power system 10 irrespective of opening and closing of the open switch 3, and the control unit 6 closes the open switch 3 when each system abnormality of the commercial power system 10 is less the less system abnormality tolerance.

Simulation of First Embodiment

Figure 3:
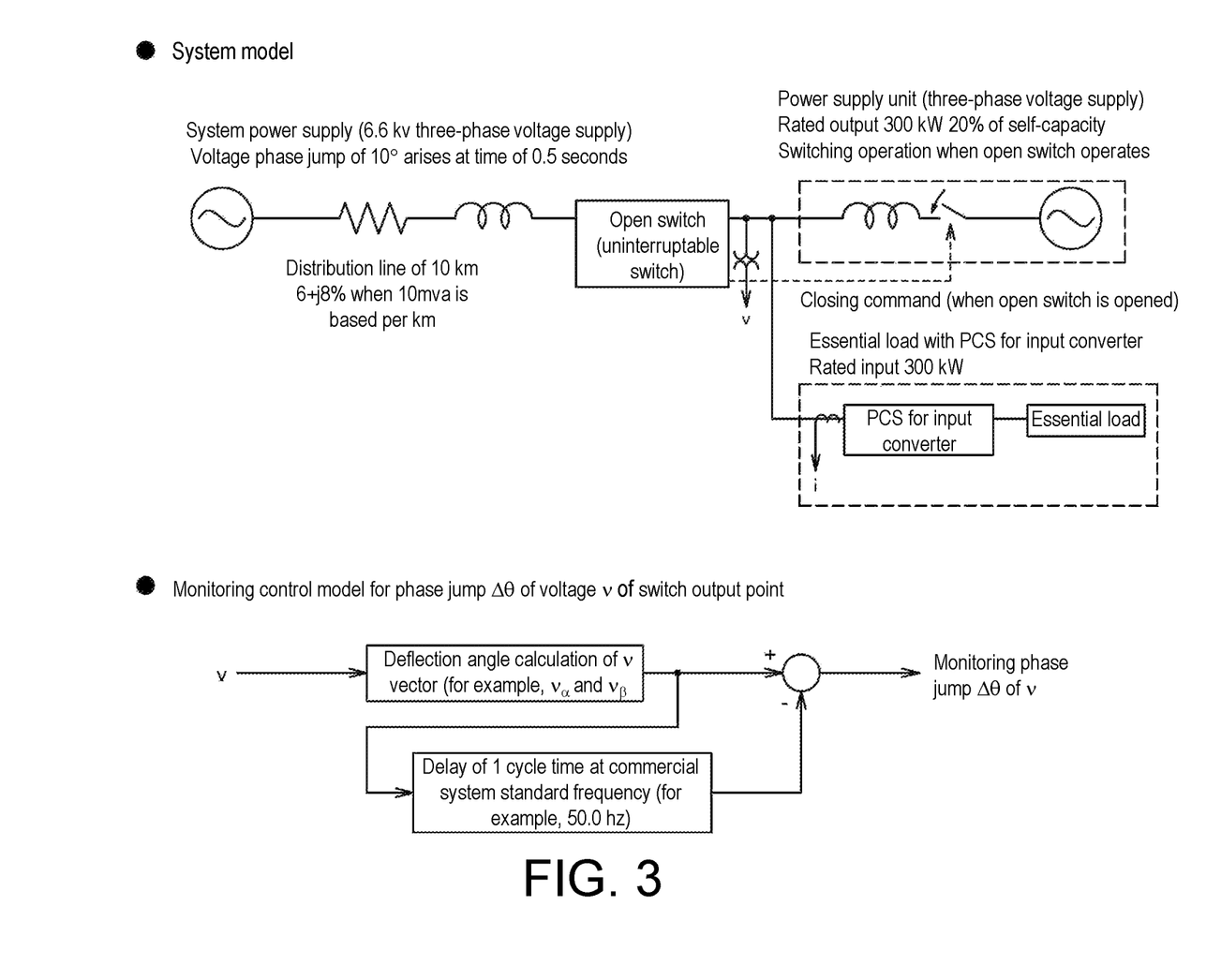
FIG. 3 is a diagram illustrating a simulation model of a compensation operation at the time of phase jump.

An influence on the power supply unit when phase jump (phase jump of 10°) occurs in a commercial power system as an example of a system abnormality was simulated. A system model for the simulation and a monitoring control model for phase jump $\Delta\theta$ of a voltage v of a switch output point are illustrated in FIG. 3.

Figure 4:
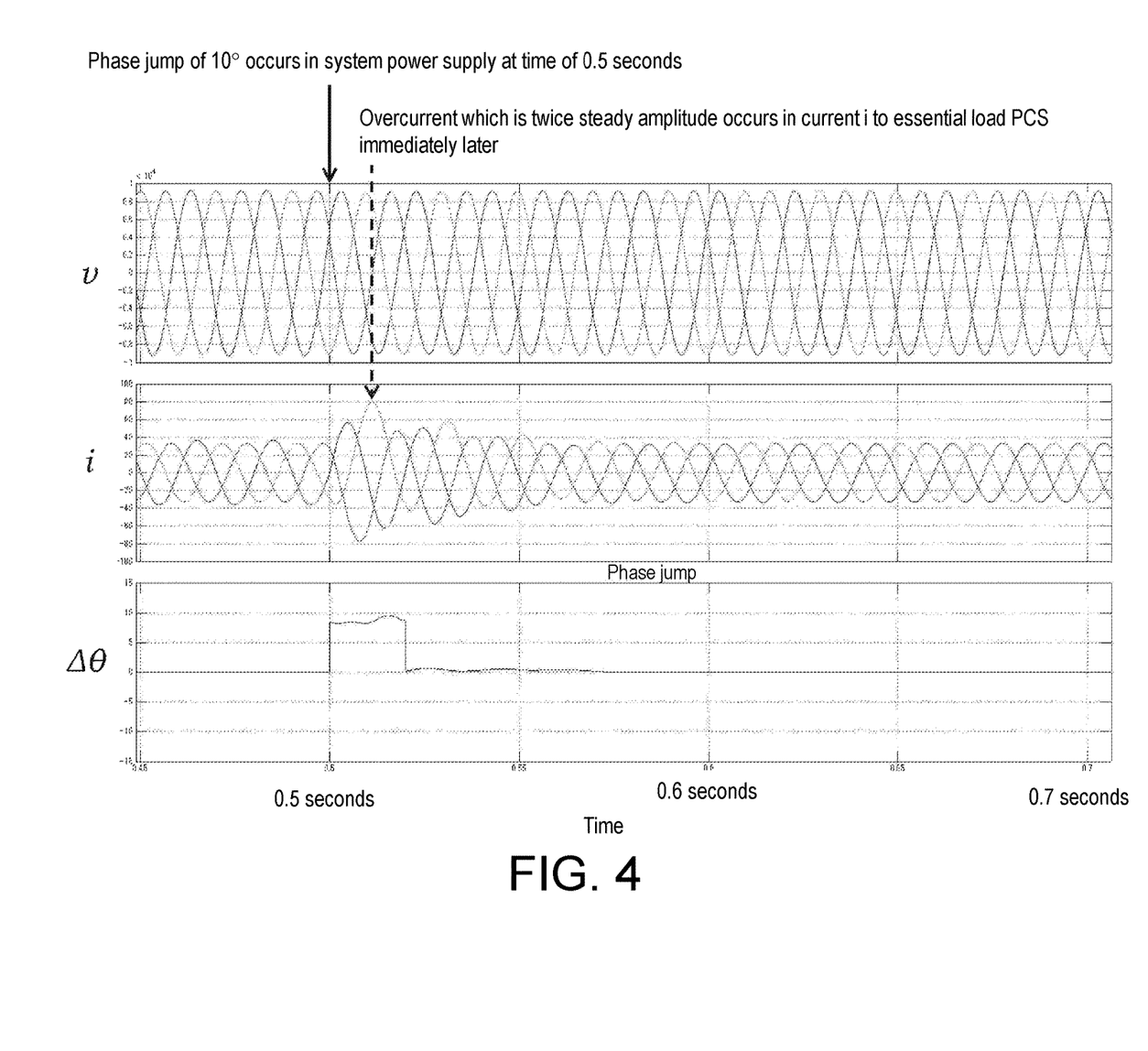
FIG. 4 is a diagram illustrating a simulation result when an open switch is not operating.

A voltage v, a current i, and the phase jump $\Delta\theta$ of the switch output point when the open switch does not operate are illustrated in FIG. 4.

A phase jump of 10° occurs in the commercial power system at a time of 0.5 seconds and an overcurrent which is twice a steady amplitude occurs in the current i to a PCS which is an essential load immediately after.

Figure 5:
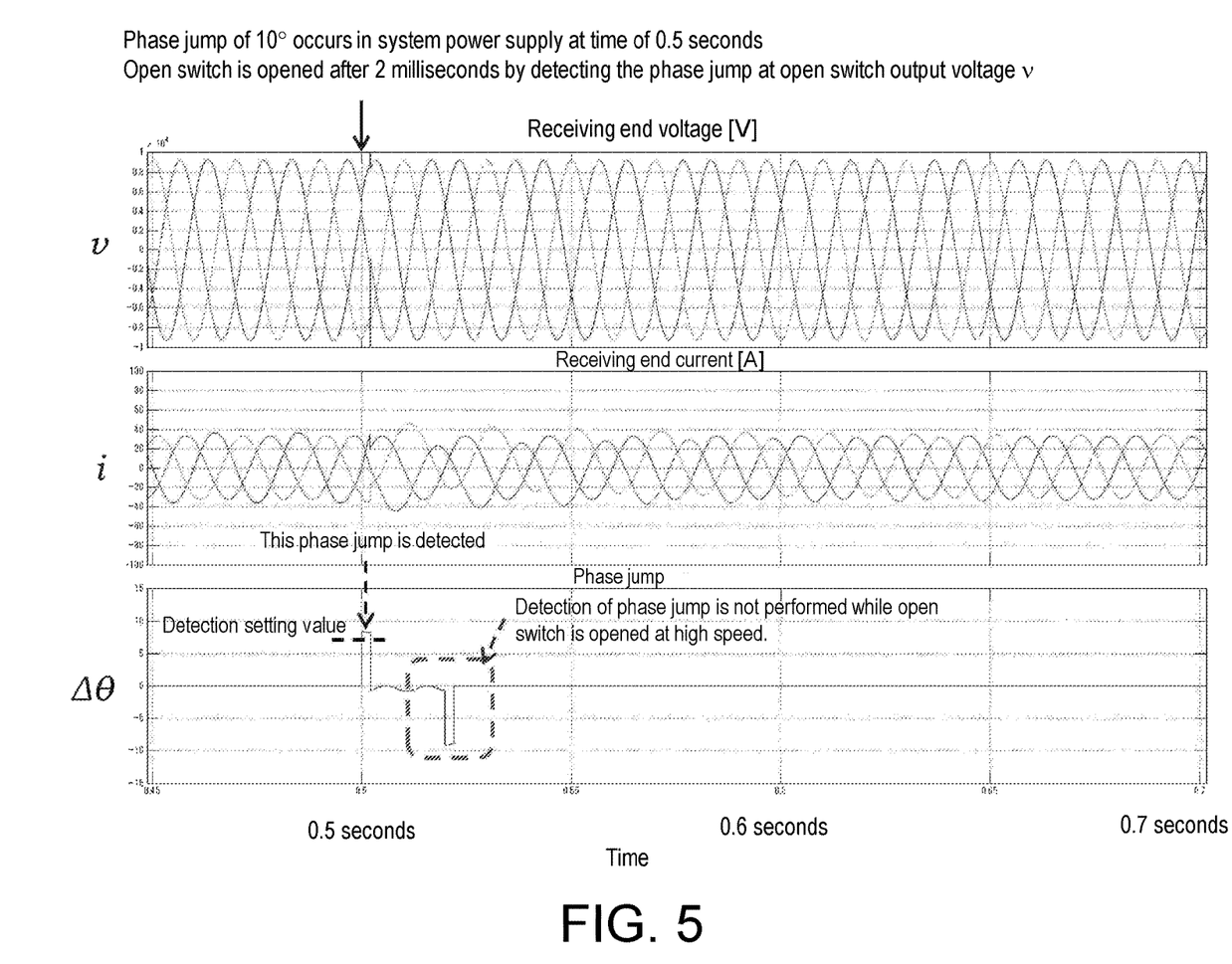
FIG. 5 is a diagram illustrating a simulation result when the open switch is operating.

A voltage v, a current i, and the phase jump $\Delta\theta$ of the switch output point when the open switch operates are illustrated in FIG. 5.

The phase jump of 10° occurs in the commercial power system at a time of 0.5 seconds and the open switch is opened after 2 milliseconds by detecting the phase jump. While the switch is opened, control is performed such that detection of the phase jump is not performed.

From the foregoing simulation result, it can be understood that voltage fluctuation at the time of occurrence of the phase jump is about 10% of the voltage amplitude and an overcurrent occurs. In this case, when phase jump is monitored and the open switch is opened before large phase jump, it is possible to inhibit the essential load from being opened (being dropped) due to an overcurrent if an overcurrent tolerance of a PCS (an inverter) of the essential load is equal to or less than twice (conversely, the essential load may be dropped due to an overcurrent if this countermeasure is not taken).

From the simulation result, it can be understood that countermeasures cannot be taken against the system abnormality despite the effective detection of a phase jump with only the function of detecting voltage drop including instantaneous voltage drop.

Advantageous Effects of First Embodiment

In the uninterruptable power supply device 100 that has the configuration according to the first embodiment, the system abnormality detection unit detects a system abnormality which is at least one of voltage rise, phase fluctuation, voltage imbalance, a harmonic abnormality, and a flicker in addition to at least one of frequency fluctuation and voltage drop including instantaneous voltage drop. Thus, when the detected system abnormality is equal to or greater than tolerance of the essential load 30 or the power supply unit 2 against the system abnormality, the open switch 3 is opened. Therefore, it is possible to respond to various system abnormalities in addition to frequency fluctuation and voltage drop including instantaneous voltage drop. Since the open switch 3 is opened using not only the tolerance of the essential load against the system abnormality but also tolerance of the power supply unit 2 against the system abnormality as parameters, it is possible to respond to a system abnormality taken into consideration for not only the essential load 30 but also the power supply unit 2.

Second Embodiment

Next, a second embodiment of the uninterruptable power supply device according to the present invention will be described.

Figure 6:
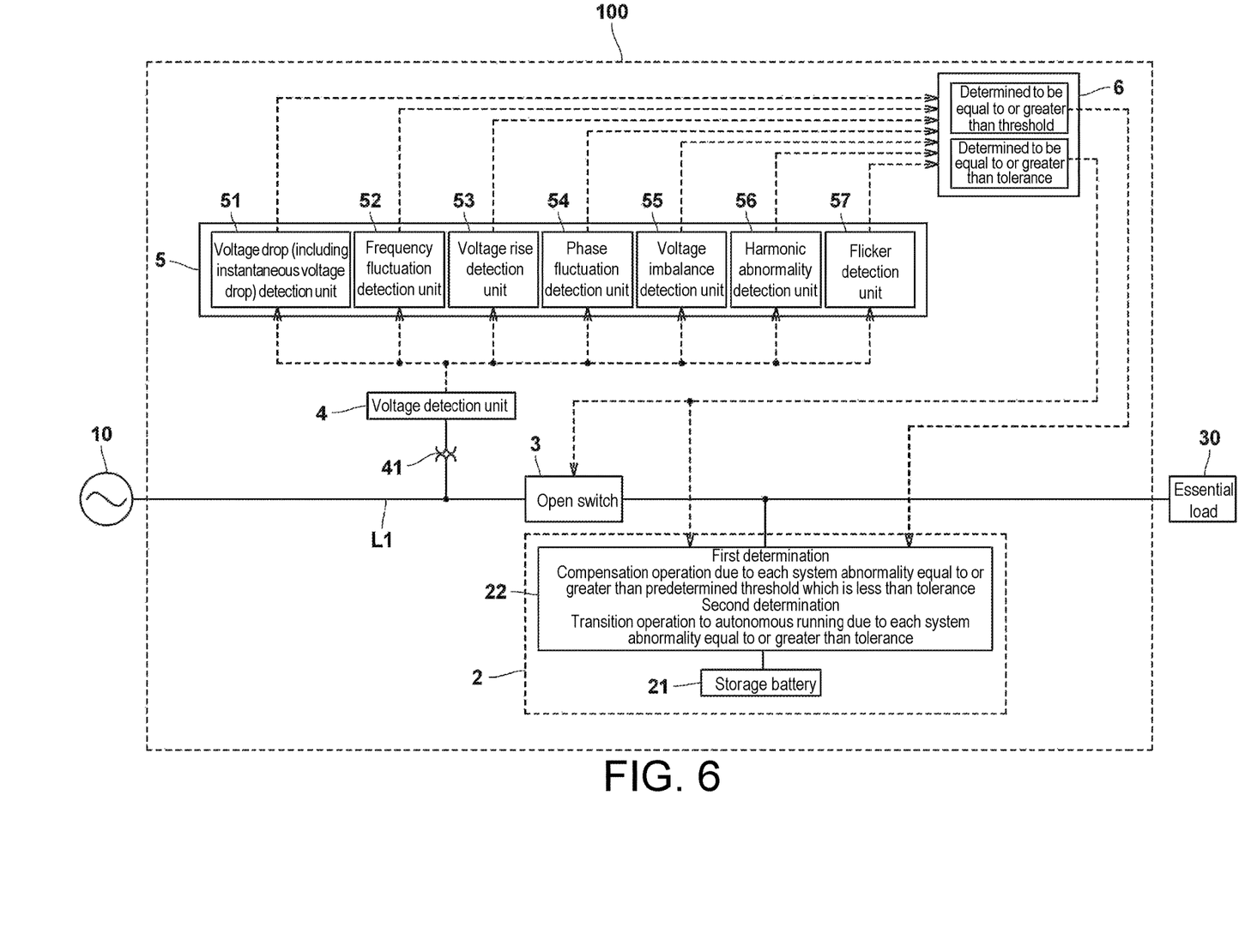
FIG. 6 is a schematic diagram illustrating a configuration of an uninterruptable power supply device according to a second embodiment.

The uninterruptable power supply device of the second embodiment differs from that of the foregoing embodiment in a configuration of the control unit 6 and an operation of the power supply unit 2, as illustrated in FIG. 6.

That is, the control unit 6 according to the second embodiment does not open the open switch 3 and the power supply unit 2 performs a compensation operation for each system abnormality when at least one of system abnormalities detected by the detection units 51 to 57 is equal to or greater than a predetermined threshold which is less than tolerance of the essential load 30 or the power supply unit 2 against the system abnormality in addition to the foregoing embodiment.

An operation of the power supply unit 2 along with specific opening and closing control on the open switch 3 by the control unit 6 will be described with reference to FIG. 7.

At the normal time, the uninterruptable power supply device 100 closes the open switch 3, and the power supply unit 2 and the essential load 30 are in a state in which the power supply unit 2 and the essential load 30 are connected to the commercial power system 10 via the open switch 3.

Figure 7:
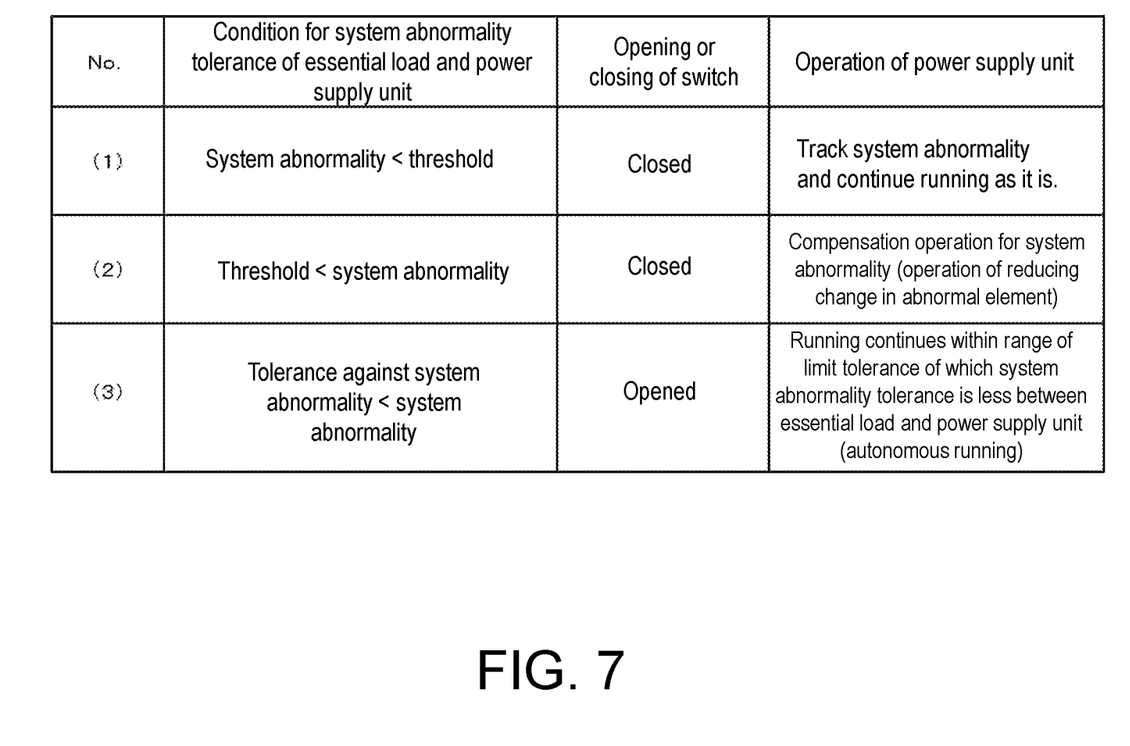
FIG. 7 is a table illustrating a list of operation states in system abnormalities according to the second embodiment.

(1) When the detected system abnormality is less than the predetermined threshold (FIG. 7 (1)), the control unit 6 holds a state in which the open switch 3 remains closed. At this time, the power supply unit 2 tracks the system abnormality of the commercial power system 10 and continues running.

(2) When the detected system abnormality is equal to or greater than the predetermined threshold (FIG. 7 (2)), the control unit 6 holds the state in which the open switch 3 remains closed. At this time, the power supply unit 2 performs a compensation operation (an operation reducing a change in a system abnormality) for the system abnormality of the commercial power system. In this case, it is assumed that the detected system abnormality is less than the tolerance of the power supply unit 2 and the essential load 30 against the system abnormality.

(3) When the detected system abnormality is equal to or greater than system abnormality tolerance less between the system abnormality tolerances of the power supply unit 2 and the essential load 30 (FIG. 7 (3)), the control unit 6 opens the open switch 3. In this state, the power supply unit 2 continues the running within a range of a tolerance limit of which the system abnormality tolerance is less between the essential load 30 and the power supply unit 2 (autonomous running of the power supply unit 2).

Advantageous Effect of Second Embodiment

In the uninterruptable power supply device 100 that has the configuration according to the second embodiment, it is possible to reduce a frequency of transition to the autonomous running in which running cost is high in addition to the advantageous effects of the first embodiment.

Other Modified Embodiments

The present invention is not limited to the foregoing embodiments.

Figure 8:
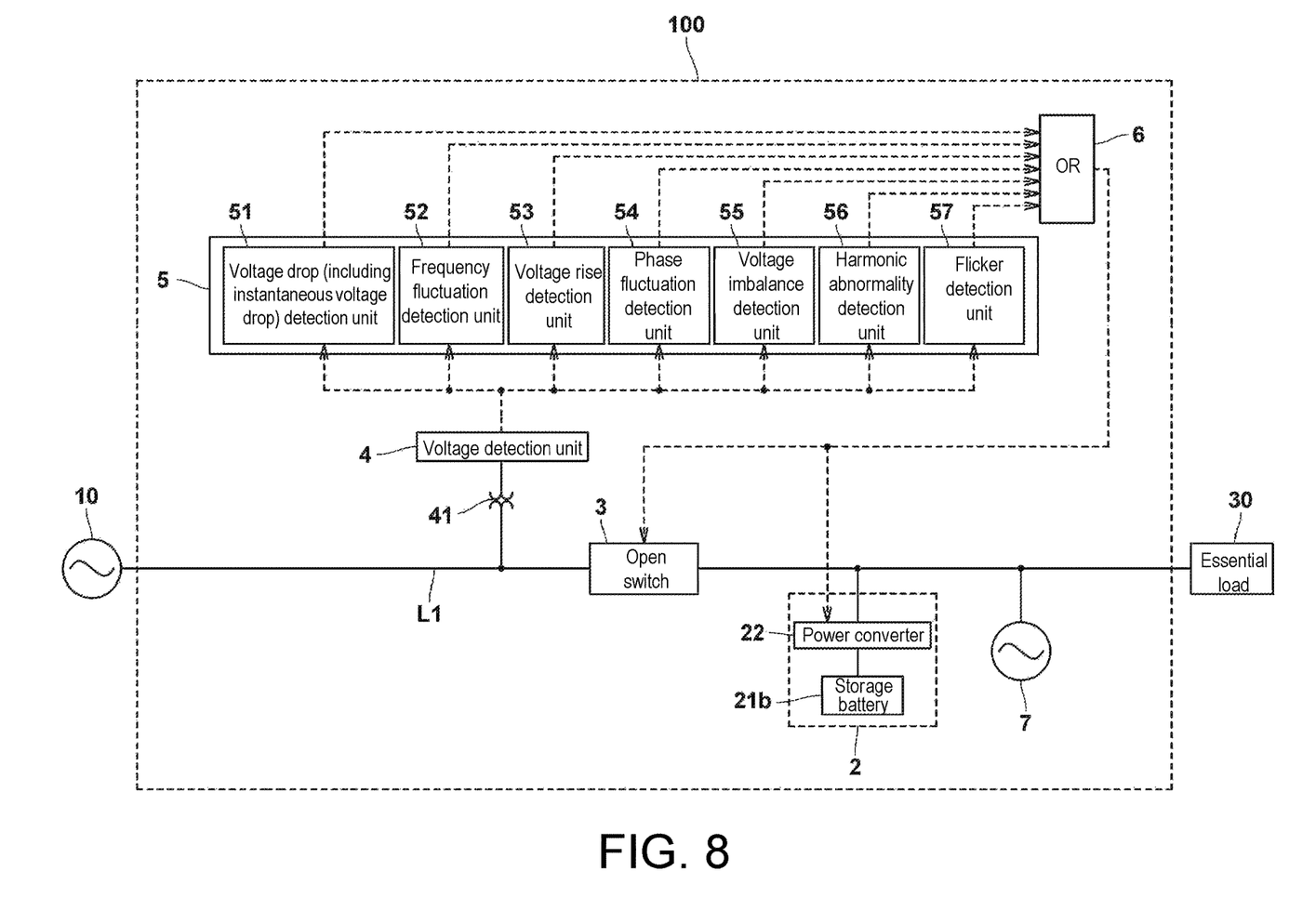
FIG. 8 is a schematic diagram illustrating a configuration of an uninterruptable power supply device according to other modified embodiments.

For example, as illustrated in FIG. 8, a generator 7 connected to the power line L1 may be included apart from the power supply unit 2. The generator 7 is connected to the essential load 30 side of the open switch 3. In this configuration, it is possible to respond to an increase in an autonomous running time (at the time of system failure).

In each of the foregoing embodiments, when any one condition for the system abnormality is satisfied, the open switch 3 is opened. However, when a combination of two or more system abnormalities satisfies a predetermined condition, the open switch 3 may be opened.

The present invention is not limited to the foregoing embodiments and it is needless to say that various modifications can be made within the scope of the present invention without departing from the gist of the present invention.

What is claimed is:

1. An uninterruptable power supply device that is provided between a commercial power system and an essential load and provides alternating-current power to the essential load, the uninterruptable power supply device comprising:
   a power supply unit comprising a power converter and a storage battery connected to a power line for supplying power from the commercial power system to the essential load;
   an open switch provided on the power line closer to the commercial power system side than the power supply unit and configured to open or close the power line which connects the commercial power system to the power supply unit and the essential load;
   a system abnormality detection unit configured to continuously detect a plurality of system abnormalities, the system abnormality detection unit comprising
   a voltage drop detection circuit capable of detecting a voltage drop abnormality of the plurality of system abnormalities of the commercial power system and outputting a voltage drop abnormality signal in response to detecting the voltage drop abnormality,
   a frequency fluctuation detection circuit capable of detecting a frequency fluctuation abnormality of the plurality of system abnormalities of the commercial power system and outputting a frequency fluctuation abnormality signal in response to detecting the voltage drop abnormality,
   a voltage rise detection circuit capable of detecting a voltage rise abnormality of the plurality of system abnormalities of the commercial power system and outputting a voltage rise abnormality signal in response to detecting the voltage rise abnormality,
   a phase fluctuation detection circuit capable of detecting a phase fluctuation abnormality of the plurality of system abnormalities of the commercial power system and outputting a phase fluctuation abnormality signal in response to detecting the phase fluctuation abnormality,
   a voltage imbalance detection circuit capable of detecting a voltage imbalance abnormality of the plurality of system abnormalities of the commercial power system and outputting a voltage imbalance abnormality signal in response to detecting the voltage imbalance abnormality,
   a harmonic abnormality detection circuit capable of detecting a harmonic abnormality of the plurality of system abnormalities of the commercial power system and outputting a harmonic abnormality signal in response to detecting the harmonic abnormality, and
   a flicker detection circuit capable of detecting a flicker abnormality of the plurality of system abnormalities of the commercial power system and outputting a flicker abnormality signal in response to detecting the flicker abnormality, and
   a control unit configured to receive a plurality of signal outputs comprising the voltage drop abnormality signal, the frequency fluctuation abnormality signal, the voltage rise abnormality signal, the phase fluctuation abnormality signal, the voltage imbalance abnormality signal, the harmonic abnormality signal, and the flicker abnormality signal, performing a logical OR operation on the plurality of signal outputs to detect at least one of the plurality of system abnormalities, and based on the plurality of signal outputs, the control unit is further configured to:
   keep detecting any of the plurality of system abnormalities and in response to any system abnormality of the plurality of system abnormalities having been detected as the open switch is closed to continue supplying power from the commercial power system to the essential load, perform a compensation for the commercial power system in response to the detected system abnormality being equal or greater than a corresponding system abnormality threshold while the open switch remains closed, and open the open switch in response to the detected system abnormality being equal or greater than a smaller of a tolerance of the essential load and a tolerance of the power supply unit; and a generator connected to the power line apart from the power supply unit, configured to provide power to the essential load.

2. The uninterruptable power supply device according to claim 1, wherein the power supply unit performs autonomous running within a tolerance limit in which the tolerance of the essential load or the power supply unit against the system abnormality is smaller n a state in which the open switch is an opened state.

3. The uninterruptable power supply device according to claim 1, wherein in response to the detected system abnormality being the phase fluctuation, the control unit is connected to the open switch and the power supply unit and causes the power supply unit to perform a compensation operation for the system abnormality resulting in overcurrent caused by a phase jumping of the commercial power system when the system abnormality detected by the system abnormality detection unit is equal to or greater than a predetermined threshold in which the degree of abnormality is less than the tolerance of the essential load or the power supply unit against the system abnormality.

4. The uninterruptable power supply device of claim 1 further comprising:

a voltage detecting unit connected to a transformer and the system abnormality detection unit and configured to detect a voltage of the commercial power system and output the voltage to a plurality of modules of the system abnormality detection unit as each of the plurality of modules of the system abnormality detection unit output a different one of the plurality of signal outputs.

5. The uninterruptable power supply device of claim 4, wherein the transformer is connected between the voltage detection unit and a position of the power line between the commercial power system and the open switch.

6. The uninterruptable power supply device of claim 1, wherein the control unit is configured to perform a compensation for the commercial power system in response to the detected system abnormality being equal or greater than the corresponding system abnormality threshold further comprising:

the detected system abnormality being below the tolerance of the essential load and the tolerance of the power supply unit.

* * * * *